United States Patent
Patterson et al.

(10) Patent No.: US 6,205,789 B1
(45) Date of Patent: Mar. 27, 2001

(54) MULTI-HOLE FILM COOLED COMBUSTER LINER

(75) Inventors: David B. Patterson, Mason; Beverly S. Duncan, West Chester; Mark G. Rettig, Cinncinnati; James E. Thompson, Middletown; Glenn E. Wiehe, Mt. Healthy, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/191,558

(22) Filed: Nov. 13, 1998

(51) Int. Cl.[7] .................................................... F23R 3/06
(52) U.S. Cl. .............................................. 60/754; 60/755
(58) Field of Search ......................... 60/39.33, 39.821, 60/752, 754, 755

(56) References Cited

U.S. PATENT DOCUMENTS

| | | | |
|---|---|---|---|
| 2,692,014 | * 10/1954 | MacCracken | 60/754 |
| 3,623,711 | * 11/1971 | Thorstenson | 60/754 |
| 4,872,312 | * 10/1989 | Iizuka et al. | 60/754 |
| 5,181,379 | 1/1993 | Wakeman et al. | 60/261 |
| 5,233,828 | 8/1993 | Napoli | 60/261 |
| 5,279,127 | 1/1994 | Napoli | 60/754 |

* cited by examiner

Primary Examiner—Louis J. Casaregola
(74) Attorney, Agent, or Firm—Andrew C. Hess; Rodney M. Young

(57) ABSTRACT

Multi-hole film cooling of combustor liners is enhanced by providing clustered groups of cooling holes in areas of the liners that would otherwise experience a loss of cooling film effectiveness. The combustor liner is made up of a shell having first and second groups of cooling holes formed therein. The cooling holes of the second group are more closely spaced than the cooling holes of the first group. The second group of cooling holes is located on an area of the shell where the cooling film effectiveness is degraded. Preferred locations include a region of the shell that is subjected to swirl impingement and a spot immediately downstream of a large opening in the shell such as a dilution hole, a borescope hole or an igniter port hole.

19 Claims, 2 Drawing Sheets

MULTI-HOLE FILM COOLED COMBUSTER LINER

BACKGROUND OF THE INVENTION

This invention relates generally to film cooled combustor liners for use in gas turbine engines and more particularly to such combustor liners having regions with closely spaced cooling holes.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Combustors used in aircraft engines typically include inner and outer combustor liners to protect the combustor and surrounding engine components from the intense heat generated by the combustion process. A variety of approaches have been proposed to cool combustor liners so as to allow the liners to withstand greater combustion temperatures. One such approach is multi-hole film cooling wherein a thin layer of cooling air is provided along the combustion side of the liners by an array of very small cooling holes formed through the liners. Multi-hole film cooling reduces the overall thermal load on the liners because the mass flow through the cooling holes dilutes the hot combustion gas next to the liner surfaces, and the flow through the holes provides convective cooling of the liner walls.

Various phenomena commonly occurring in gas turbine combustors can reduce the cooling film effectiveness and bring hot gases next to the liner surfaces. One such condition is swirl impingement, which is caused by swirlers located in the fuel nozzles to promote better combustion. The swirl of the combustion flow induced by the swirlers causes hot gases to impinge against the liners. Swirl impingement is typically confined to distinct regions on the liner surfaces, which are a function of the combustor design. These regions will experience a loss of cooling film effectiveness and thus be more susceptible to thermal degradation. Another cause of reduction in cooling film effectiveness is the presence in the combustor liners of dilution holes, borescope holes, igniter port holes and the like. Because such holes are considerably larger than the cooling holes, the wake produced by the influx of air through these larger holes will disrupt the cooling film behind them. Thus, regions of the liners immediately downstream of dilution and other liner holes will also be prone to a loss of cooling film effectiveness.

Accordingly, there is a need for a combustor liner in which cooling film effectiveness is increased in the areas of the liner that are otherwise susceptible to a loss of cooling film effectiveness.

SUMMARY OF THE INVENTION

The above-mentioned needs are met by the present invention which provides a gas turbine combustor liner made up of a shell having first and second groups of cooling holes formed therein, wherein the cooling holes of the second group are more closely spaced than the cooling holes of the first group. The second group of cooling holes is located on an area of the shell where the cooling film effectiveness is degraded. Preferred locations include a region of the shell that is subjected to swirl impingement and a spot immediately downstream of a large opening in the shell such as a dilution hole, a borescope hole or an igniter port hole.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
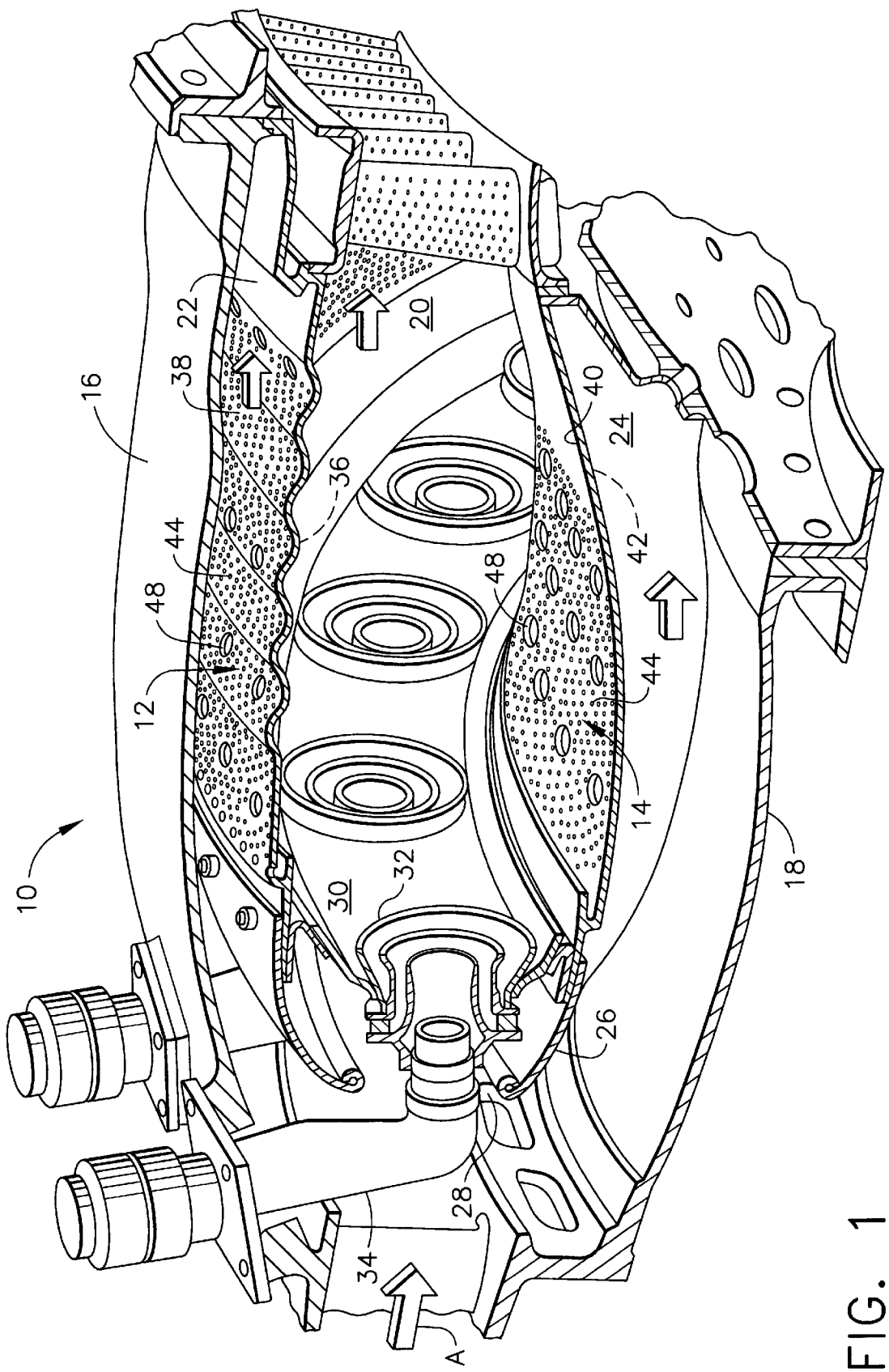
FIG. 1 is a cutaway perspective view of a gas turbine combustor having combustor liners of the present invention.

Referring to the drawings wherein identical reference numerals denote the same elements throughout the various views, FIG. 1 shows a combustor 10 of the type suitable for use in a gas turbine engine. Combustor 10 includes an outer liner 12 and an inner liner 14 disposed between an outer combustor casing 16 and an inner combustor casing 18. Outer and inner liners 12 and 14 are radially spaced from each other to define a combustion chamber 20. Outer liner 12 and outer casing 16 form an outer passage 22 therebetween, and inner liner 14 and inner casing 18 form an inner passage 24 therebetween. A cowl assembly 26 is mounted to the upstream ends of outer and inner liners 12 and 14. An annular opening 28 is formed in cowl assembly 26 for the introduction of compressed air into combustor 10. The compressed air is supplied from a compressor (not shown) in a direction generally indicated by arrow A of FIG. 1. The compressed air passes principally through annular opening 28 to support combustion and partially into outer and inner passages 22 and 24 where it is used to cool the liners 12 and 14.

Disposed between and interconnecting the outer and inner liners 12 and 14 near their upstream ends is an annular dome plate 30. A plurality of circumferentially spaced swirler assemblies 32 is mounted in dome plate 30. Each swirler assembly 32 receives compressed air from annular opening 28 and fuel from a corresponding fuel tube 34. The fuel and air are swirled and mixed by swirler assemblies 32, and the resulting fuel/air mixture is discharged into combustion chamber 20. It is noted that although FIG. 1 illustrates one preferred embodiment of a single annular combustor, the present invention is equally applicable to any type of combustor, including double annular combustors, which uses multi-hole film cooling.

Outer and inner liners 12 and 14 each comprise a single wall, metal shell having a generally annular and axially extending configuration. Outer liner 12 has a hot side 36 facing the hot combustion gases in combustion chamber 20 and a cold side 38 in contact with the relatively cool air in outer passage 22. Similarly, inner liner 14 has a hot side 40 facing the hot combustion gases in combustion chamber 20 and a cold side 42 in contact with the relatively cool air in inner passage 24. Both liners 12 and 14 include a large number of closely spaced cooling holes 44 formed therein.

Figure 2:
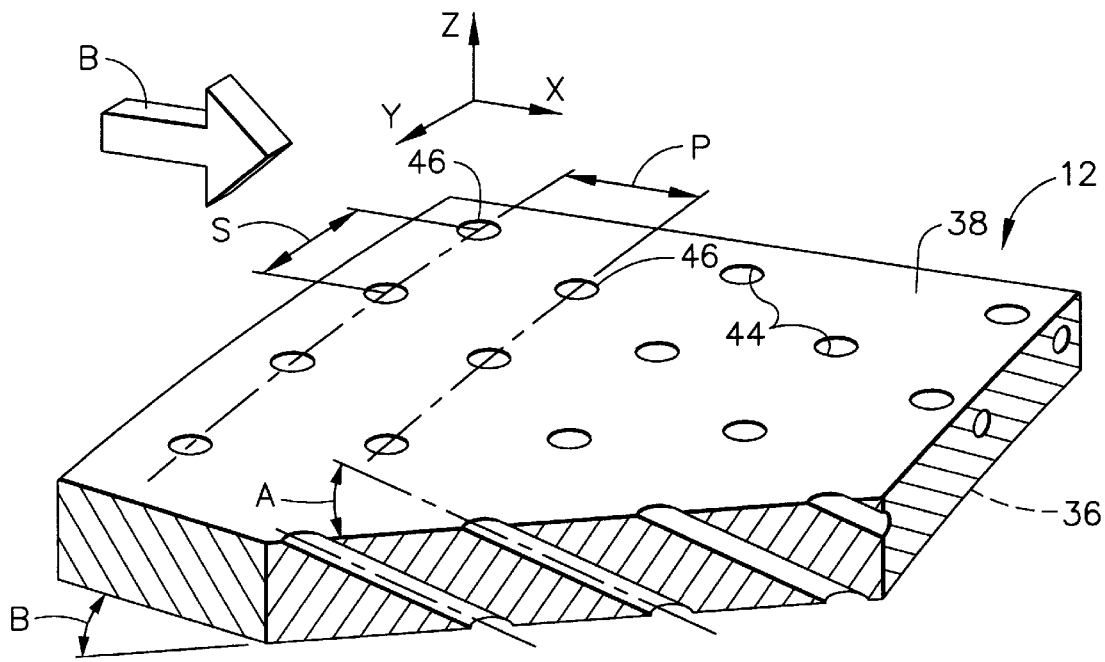
FIG. 2 is a perspective view of a portion of a combustor liner depicting angled multi-hole cooling holes.
Figure 3:
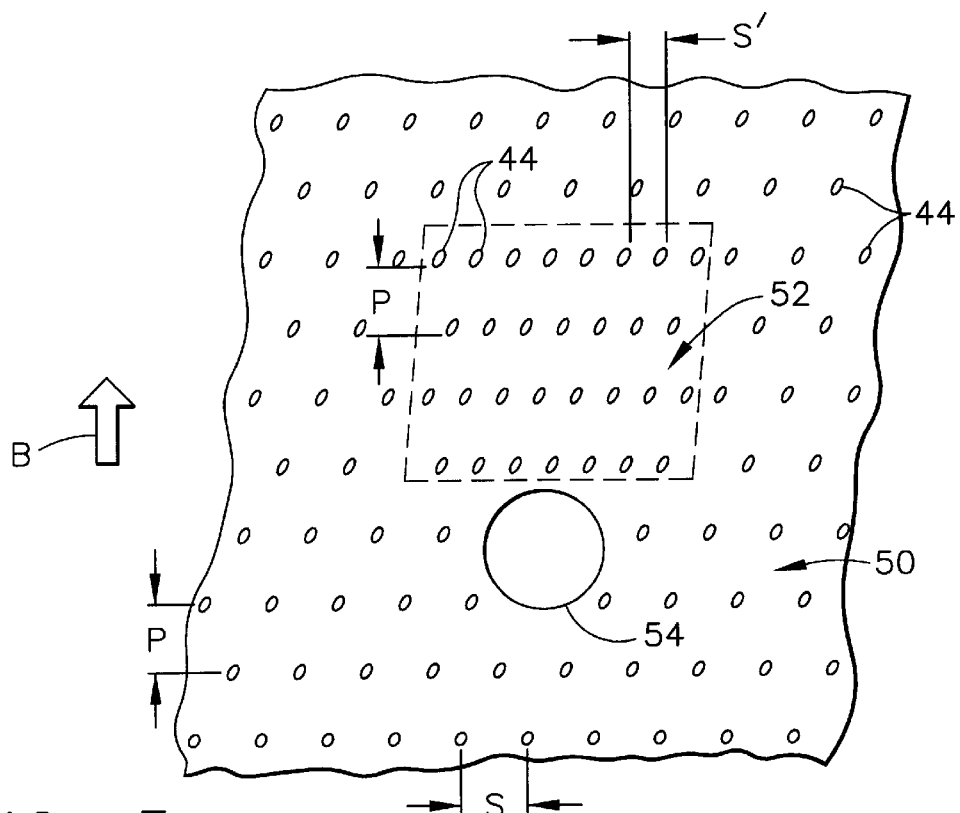
FIG. 3 is a top view of a portion of a combustor liner depicting the spacing of the multi-hole cooling holes of the present invention.

Turing now to FIGS. 2 and 3, cooling holes 44 disposed through a portion of outer liner 12 are shown in more detail.

Although FIGS. 2 and 3 depict cooling holes in outer liner 12, it should be understood that the configuration of cooling holes of inner liner 14 is substantially identical to that of outer liner 12. As such, the following description will also apply to inner liner 14. FIG. 2 includes a frame of reference having axes labeled X, Y and Z, wherein X is the downstream axial direction of flow (indicated by arrow B) through combustor 10, Y is the circumferential direction, and Z is a radial direction. Cooling holes 44 axially slanted from cold side 38 to hot side 36 at a downstream angle A, which is preferably in the range of about 15° to 20° and are circumferentially slanted or clocked at a clock angle B. Clock angle B preferably corresponds to the swirl of flow through combustor chamber 20, which is generally in the range of about 30° to 65°. Cooling holes 44 are arranged in a series of circumferentially extending rows 46. Adjacent holes 44 in each row have a circumferential hole spacing S, between their respective centerlines, and adjacent rows 46 have an axial row spacing P.

Dilution air is primarily introduced into combustor chamber 20 through a plurality of circumferentially spaced dilution holes 48 (FIG. 1) disposed in each of outer and inner liners 12 and 14. Dilution holes 48 are generally far smaller in number than the cooling holes 44, and each dilution hole 48 has a cross-sectional area that is substantially greater than the cross-sectional area of one of the cooling holes 44. Dilution holes 48, and to a smaller extend cooling holes 44, serve to admit dilution air into combustor chamber 20 that will promote some additional combustion.

Conventionally, cooling holes in typical combustor liners have very small diameters on the scale of about 0.02 inches (0.51 mm) and circumferential hole spacing of about 0.13 inches (3.30 mm), or about 6.5 hole diameters. The axial row spacing is generally equal to the circumferential hole spacing. As discussed above, such conventional hole spacing works well in most liner regions, but liner regions subjected to swirl impingement and/or located immediately downstream of large liner openings such as dilution holes, borescope holes and igniter port holes can experience a loss of cooling film effectiveness. Referring now to FIG. 3, the cooling hole spacing of the present invention is illustrated wherein conventional cooling hole spacing is used in all liner regions where cooling film effectiveness is not degraded and tighter cooling hole spacing is used in regions where cooling film effectiveness is degraded. Tighter cooling hole spacing results in more cooling holes per unit area in the region, thereby supplying additional cooling air which increases cooling film effectiveness. In addition to adding extra cooling air to the specific regions where cooling film effectiveness is degraded, the tighter cooling hole spacing of the present invention provides additional convective cooling in the region, thereby reducing the bulk metal temperature. By employing tighter cooling hole spacing only in specific regions where cooling film effectiveness is degraded, the multi-hole film cooling is bolstered where needed without wasting air overcooling non-problem areas.

Specifically, FIG. 3 shows a portion of combustor liner 12 having a first group 50 of cooling holes 44 having conventional spacing (i.e., circumferential hole spacing S and axial row spacing P are both about 6.5 hole diameters or 0.13 inches (3.30 mm)) and a second group 52 of cooling holes 44 (enclosed by dotted lines in FIG. 3) with a tighter circumferential hole spacing S'. Preferably, cooling holes 44 of second group 52 have a diameter of about 0.02 inches (0.51 mm) and a circumferential hole spacing S' of about 4 hole diameters or 0.08 inches (2.03 mm). It is within the scope of the present invention to provide second group 52 with a tighter axial row spacing; however, the axial row spacing P in second group 52 is preferably the same as that of first group 50. By using the same hole diameter and axial row spacing P for both first and second groups 50 and 52, machining operations can be performed continually without requiring an additional setup operation.

As mentioned above, tighter cooling hole spacing can be used wherever cooling film effectiveness is degraded. Second group 52 of FIG. 3 is located immediately downstream of a large opening or hole 54 in outer liner 12 to counter the disruptive effects the wake from hole 54 will have on the cooling film there. For the purposes of the present invention, hole 54 can be any type of hole formed in a combustor liner such as a dilution hole, borescope hole or igniter port hole. Second group 52 could also be located anywhere on liner 12 that is subject to swirler impingement. It should be understood that the present invention is not limited to a single group of cooling holes having tighter circumferential hole spacing. Multiple groups of cooling holes having tighter circumferential hole spacing can be formed, as needed, at different locations on a single combustor liner.

The foregoing has described a multi-hole film cooled combustor liner having closely packed groups of cooling holes in regions needing increased cooling effectiveness. While specific embodiments of the present invention have been described, it will be apparent to those skilled in the art that various modifications thereto can be made without departing from the spirit and scope of the invention as defined in the appended claims.

What is claimed is:

1. A gas turbine combustor liner comprising:
   a shell having a large opening formed therein, said large opening being one of a dilution hole, a borescope hole or an igniter port;
   a first group of cooling holes formed in said shell; and
   a second group of cooling holes formed in said shell immediately downstream of said large opening, wherein said cooling holes of said second group are more closely spaced than said cooling holes of said first group.

2. The combustor liner of claim 1 wherein said large opening is a dilution hole.

3. The combustor liner of claim 1 wherein said large opening is a borescope hole.

4. The combustor liner of claim 1 wherein said large opening is an igniter port hole.

5. The combustor liner of claim 1 wherein said shell has an annular configuration and said cooling holes of said first and second groups are all arranged in a series of circumferentially extending rows, wherein adjacent cooling holes in each row have a circumferential hole spacing and adjacent rows have an axial row spacing.

6. The combustor liner of claim 5 wherein the circumferential hole spacing of said second group of cooling holes is less than the circumferential hole spacing of said first group of cooling holes.

7. The combustor liner of claim 6 wherein the axial row spacing of said second group of cooling holes is equal to the axial row spacing of said first group of cooling holes.

8. The combustor liner of claim 6 wherein the circumferential hole spacing of said first group of cooling holes is equal to the axial row spacing of same first and second groups of cooling holes.

9. The combustor liner of claim 5 wherein said cooling holes of said first and second groups all have a uniform diameter.

10. The combustor liner of claim 9 wherein the circumferential hole spacing of said first group of cooling holes is equal to about 6.5 hole diameters.

11. The combustor liner of claim 10 wherein the circumferential hole spacing of said second group of cooling holes is equal to about 4 hole diameters.

12. A gas turbine combustor liner comprising:
   a shell having at least one region that is subjected to swirl impingement;
   a first group of cooling holes formed in said shell; and
   a second group of cooling holes formed in said shell in said region, wherein said cooling holes of said second group are more closely spaced than said cooling holes of said first group.

13. The combustor liner of claim 12 wherein said shell has an annular configuration and said cooling holes of said first and second groups are all arranged in a series of circumferentially extending rows, wherein adjacent cooling holes in each row have a circumferential hole spacing and adjacent rows have an axial row spacing.

14. The combustor liner of claim 13 wherein the circumferential hole spacing of said second group of cooling holes is less than the circumferential hole spacing of said first group of cooling holes.

15. The combustor liner of claim 14 wherein the axial row spacing of said second group of cooling holes is equal to the axial row spacing of said first group of cooling holes.

16. The combustor liner of claim 15 wherein the circumferential hole spacing of said first group of cooling holes is equal to the axial row spacing of said first and second groups of cooling holes.

17. The combustor liner of claim 13 wherein said cooling holes of said first and second groups all have a uniform diameter.

18. The combustor liner of claim 17 wherein the circumferential hole spacing of said first group of cooling holes is equal to about 6.5 hole diameters.

19. The combustor liner of claim 18 wherein the circumferential hole spacing of said second group of cooling holes is equal to about 4 hole diameters.

* * * * *